United States Patent
Scheckenbach et al.

(10) Patent No.: US 6,365,274 B1
(45) Date of Patent: Apr. 2, 2002

(54) THERMAL SPRAY POWDER INCORPORATING A PARTICULAR HIGH TEMPERATURE POLYMER

(75) Inventors: DI. Helmut Scheckenbach, Langen (DE); Christopher William Smith, Farnham (GB)

(73) Assignee: Ticona GmbH, Frankfurt (DE)

( * ) Notice: Subject to any disclaimer, the term of this patent is extended or adjusted under 35 U.S.C. 154(b) by 0 days.

(21) Appl. No.: 09/257,737

(22) Filed: Feb. 25, 1999

(30) Foreign Application Priority Data

Feb. 27, 1998 (EP) .............................. 98301492

(51) Int. Cl.[7] .......................... B32B 5/16; C08F 283/08; C08G 75/16
(52) U.S. Cl. ...................... 428/402; 428/403; 428/407; 525/534; 525/537; 528/388
(58) Field of Search ................. 428/402, 403, 428/407; 525/534, 537; 528/388

(56) References Cited

U.S. PATENT DOCUMENTS

| | | | | |
|---|---|---|---|---|
| 4,021,596 A | * | 5/1977 | Bailey | 428/375 |
| 4,130,675 A | * | 12/1978 | Vassiliou et al. | 427/333 |
| 4,724,172 A | * | 2/1988 | Mosser et al. | 427/383.5 |
| 5,475,081 A | * | 12/1995 | Imai et al. | 528/388 |
| 5,496,917 A | * | 3/1996 | Fleischer et al. | 528/373 |
| 5,530,050 A | | 6/1996 | Rangaswamy | |
| 5,670,569 A | * | 9/1997 | Scheckenbach et al. | 524/500 |
| 5,708,089 A | * | 1/1998 | Scheckenbach et al. | 525/189 |
| 5,780,561 A | * | 7/1998 | Scheckenbach et al. | 525/534 |
| 5,852,139 A | * | 12/1998 | Scheckenbach | 525/537 |
| 6,020,442 A | * | 2/2000 | Fleischer et al. | 525/537 |
| 6,025,440 A | * | 2/2000 | Scheckenbach et al. | 525/189 |
| 6,074,740 A | * | 6/2000 | Scheckenbach et al. | 428/327 |

FOREIGN PATENT DOCUMENTS

| | | |
|---|---|---|
| EP | 0433778 | 6/1991 |
| EP | 0487272 | 5/1992 |
| EP | 0487273 | 5/1992 |
| EP | 0532134 | 3/1993 |
| EP | 0829505 | 3/1998 |

* cited by examiner

Primary Examiner—Hoa T. Le
(74) Attorney, Agent, or Firm—Frommer Lawrence & Haug LLP

(57) ABSTRACT

Powders of oxidized polyarylene sulfide and powders comprising from 1 to 99% by weight of oxidized polyarylene sulfide and from 1 to 99% by weight of a metal, carbide, ceramic or high temperature polyimide, polyamide imide, polyester imide and aromatic polyester plastic, or a mixture thereof are very suitable for use in thermal spraying and thereby form coatings having a strong chemical and mechanical resistance and high dimensional stability when exposed to high and low temperatures. Such coatings are advantageous for use as abradable seal clearance control coating in the compressor section of gas turbine engines, motor vehicle turbochargers and superchargers, and for use as a coating of reaction vessels, kitchen ware, sealings or bearings.

20 Claims, No Drawings

THERMAL SPRAY POWDER INCORPORATING A PARTICULAR HIGH TEMPERATURE POLYMER

CROSS-REFERENCE TO RELATED APPLICATIONS

This application claims priority to European Application no. 98301492.9, filed Feb. 27, 1998.

STATEMENT REGARDING FEDERALLY SPONSORED RESEARCH OR DEVELOPMENT

Not applicable.

BACKGROUND OF THE INVENTION

1. Field of the Invention

The invention relates to a material used for thermal spraying made from, or preferably, incorporating a particular high temperature polymer, and to a process of forming a coating from such material by thermal spraying.

2. Description on the Related Art

Thermal spraying is a generic term describing established engineering processes whereby a material is formed into a coating by projecting particles in a stream of hot gases onto a surface. The invention relates primarily to thermal spray processes in which the material to be deposited is in powder form, but it also includes thermal spray processes where the material to be deposited is in the form of a rod or strand, or fabricated structure comprising for example a tube filled with compacted powder, or any other form in which it can be fed into thermal spray equipment. The invention relates to all types of thermal spray processes including the following specific examples:

Plasma flame spraying including

Conventional plasma spraying in natural atmosphere known as Atmosphere Plasma Spraying (APS);

Plasma spraying in a controlled atmosphere such as an inert gas, known as Controlled Atmosphere Plasma Spraying (CAPS), this includes but is not limited to the atmosphere being controlled by enclosing the process in a chamber containing the desired gas or gas combination, or by flooding the plasma stream by the desired gas or gas combination;

Plasma spraying in a partial or complete vacuum known as Vacuum Plasma Spraying (VPS).

Combustion thermal spray processes including

A conventional combustion flame, normally resulting from the combustion of a fuel gas such as acetylene in the presence of oxygen.

A high velocity stream of hot gases resulting from the combustion of a fuel, which may be gaseous or liquid, in the presence of oxygen and the expansion of the hot gasses being controlled and channelled through an exit nozzle. This process is well known and recognized by the description, high velocity oxy fuel (HVOF);

A process as described above but the combustion is supported by air instead of oxygen and is known and recognized by the description high velocity oxy air (HVAF).

And Electric arc thermal spray processes where the heat source is derived from an electric arc struck between a cathode and anode where either or both may comprise the material being sprayed.

Powders for thermal spraying typically comprise metals and/or carbides and/or ceramics although they can also comprise high temperature polymers and mixtures of high temperature polymers and metals to which the British patent specification GB 1 356 017 refers. In particular, GB 1 356 017 discloses high temperature polyimide, polyamide imide, polyester imide and aromatic polyester plastics suitable for flame spraying processes. Although these high temperature polymers, in particular aromatic polyester plastics, are used in a number of technically important applications, their physical properties, e.g. the resistance against corrosion through salt containing steam, are limited.

So far, oxidized polyarylene sulfides are used as additives to other polymers such as fluorocarbon polymers (EP-A-0 633 290 and EP-A-0 633 291) where they act as fillers, or they are processed into molded or functional parts for applications where resistance to high temperatures is required (EP-B-0 623 639 and EP-A-0 623 640).

It has now surprisingly been discovered that oxidized polyarylene sulfides are very suitable for use in thermal spraying and thereby form coatings having a strong chemical and mechanical resistance and high dimensional stability when exposed to high and low temperatures.

The invention provides a thermal spray powder comprising from 1 to 99% by weight, preferably from 5 to 60% by weight, and particular preferably from 20 to 45% by weight of oxidized polyarylene sulfide and from 1 to 99% by weight, preferably from 40 to 95% by weight, and particular preferably from 55 to 80% by weight of a metal powder.

The invention also provides a process of forming a thermal spray powder comprising or essentially consisting of oxidized polyarylene sulfide into a coating by thermal spraying, and a coating produced from a thermal spray powder comprising or essentially consisting of oxidized polyarylene sulfide.

BRIEF DESCRIPTION OF THE SEVERAL VIEWS OF THE DRAWING(S)

Not applicable.

DETAILED DESCRIPTION OF THE INVENTION

Thermal spray powders comprising oxidized polyarylene sulfide exhibit improved flow and trickle properties compared with conventionally used thermal spray powders comprising high temperature polymers. This enhanced property is particularly important for the processing of the powder by thermal spraying.

Further, coatings obtained by thermal spraying powders comprising oxidized polyarylene sulfide are extremely resistant against corrosion through hot and salt containing steam.

Polymers which can be used for the thermal spray powder according to the invention are linear and branched polyarylenes whose recurring units contain at least one $SO_2$ or SO group as bridge and which have a heat resistance which is adequate for the thermal spraying applications and processing. Favorable polyarylenes have the formula (I)

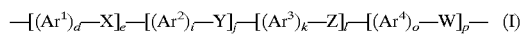

$$—[(Ar^1)_d—X]_e—[(Ar^2)_i—Y]_j—[(Ar^3)_k—Z]_l—[(Ar^4)_o—W]_p— \quad (I)$$

in which each $Ar^1$, $Ar^2$, $Ar^3$, $Ar^4$, W, X, Y and Z, independently of the others, is identical to or different from the others. The indices d, e, i, j, k, l, o and p are, independently of one another, zero or integers 1, 2, 3, or 4, where at least one of the indices d, i, k and o and at least one of the indices e, j, l and p must be 1. $Ar^1$, $Ar^2$, $Ar^3$ and $Ar^4$ in the formula (I) are simple or directly para-, meta- or ortho-linked arylene systems having 6 to 18 carbon atoms, W, X, Y and Z are linking groups selected from —SO$_2$—, —S—, —SO—, —CO—, —COO—, alkylene or alkylidene groups, each having 1–6 carbon atoms, and —NR$_1$—groups where R$_1$ is an alkyl or alkylidene group having 1–6 carbon atoms, with the proviso that at least one of the linking groups W, X, Y and Z in formular (I) is —SO— or —SO$_2$—.

Particularly suitable polymers are polyaryienes containing recurring units of the formula (II)

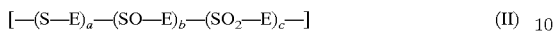

(II)

in which each E, independently of the others, is phenylene, naphthylene or biphenylene, b and c, independently of one another, have values of from 0 to 1 and a has values of from 0 to less than 1, with the proviso that the sum a+b+c is equal to 1 and at least one of the indices is greater than zero and if any sulfur links (—S—) are present, at least further —SO$_2$— or —SO— links are also present.

Particularly preferred oxidized polyarylene sulfides are linear or branched polyarylene sulfones, polyarylene sulfide sulfones, polyarylene sulfoxide sulfones, or polyarylene sulfide sulfoxide sulfones.

Polymers which can be specifically employed are those containing recurring units of formulae (III)–(VI)

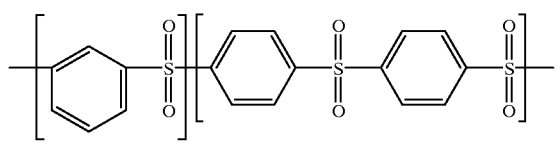

(III)

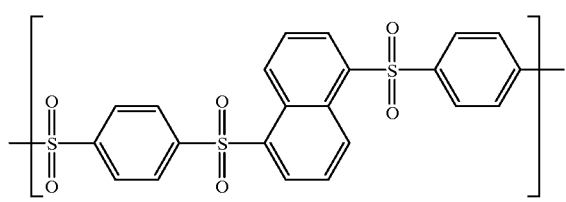

(IV)

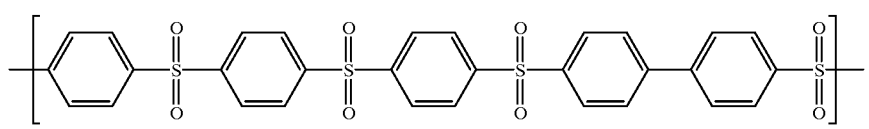

(V)

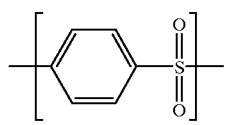

(VI)

and oxidized polyphenylene sulfides containing recurring units of the formula (VII)

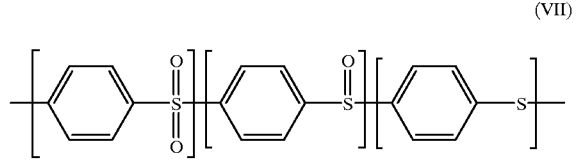

(VII)

where the degree of oxidation is at least 50% based on 100% of the theoretically possible uptake of oxygen (100% sulfone groups).

The oxidized polyarylene sulfides can be prepared by the processes described in German patent applications: DE 43 14 738, DE 43 14 737, DE 43 14 736, DE 43 14 735, DE 44 40 010, P 195 31 163.9, DE 196 36 692.5, DE 196 37 845.1, DE 197 16 016 and DE 197 51 239.9, which are expressly incorporated herein by way of reference.

Subsequent references in this specification to "the polymer" in the singular includes reference to each and all of the oxidized polyarylene sulfides described above.

In principle, the polymer can be used for thermal spraying without adding any further components and/or additives. Thermal sprayed coatings of the polymer itself reflect the basic desirable characteristics of the material, including dimensional stability at high temperature, high adhesion to metals, dielectric strength and high resistance to chemical corrosion. Compared with coatings obtained from the polymer through other coating processes, a coating obtained by thermal spraying has greater adhesion onto a surface.

However, the characteristics can be further improved by increasing the strength and cohesiveness of the coating thereby improving the resistance to erosion. Also the resistance to thermal cycling can be improved. These improvements are achieved by the addition of a second component, for example by addition of metals, carbides, ceramics and other high temperature polymers like polyimides, polyamide imides, polyester imides or aromatic polyester plastics, or mixtures thereof. Preferably, these improvements are achieved by the addition of metals. A metal addition to the polymer also enhances the bonding of any subsequent metal layers on the thermal sprayed coating. Further, thermal spray powders comprising the polymer and such second component, in particular if particles made up of the second component are blended or coated with the polymer, exhibit improved flow and trickle properties.

It is also possible to add conventional additives and fillers, for example stabilizers, color pigments, mineral fibers, in particular glass or carbon fibers, and the like to the thermal spray powder. The only requirement to such additives and fillers is that they remain stable in the thermal spraying process.

The thermal spray powder generally comprises from 1 to 99% by weight, preferably from 5 to 60% by weight, and particular preferably from 20 to 45% by weight of the polymer. The share of any other component, in particular of a metal, ceramic, other high temperature polymer, mineral filler or mixtures thereof, is from 1 to 99% by weight, preferably from 40 to 95% by weight, and particular preferably from 55 to 80% by weight of the thermal spray powder.

In the case of metal additions, the proportion of the polymer is preferably of from 5 to 60% by weight of the thermal spray powder, and during the thermal spray process the metal particles are heated to a temperature close to their melting point and the polymer particles are surface heat softened. Propelling the heated particles, or mixture of particles onto a surface results in the formation of a coating. Typical metals for mixing with the polymer are aluminum, alloys of aluminum, copper, bronze, babbit, nickel alloys, stainless steels and alloys of cobalt/nickel/chrome/aluminum/yttrium (the latter well known by the generic term "MCrAlYs"). Since the density of the metal will be significantly greater than that of the polymer the weight percentage of polymer for a given mixture will be less than the volume percentage.

Materials which perform as solid lubricants, including but not limited to molybdenum disulphide, calcium fluoride, bentonite, mullite, graphite or boron nitride, can also be added to the thermal spray powder. Often such materials will be used in combination with metals and the polymer.

In accordance with the invention the polymer (normally in powder form) is deposited into a coating by thermal spraying, or preferably is first mixed with any other component in powder form to form either a physical mixture, a composite powder, or combination thereof, and is then deposited into a coating by thermal spraying.

If the powder is in the form of composite particles, the composite particles can comprise for example relatively large particles of the polymer coated with relatively fine particles of the added material, or alternatively for example relatively large particles of the added material coated with relatively fine particles of the polymer. The bonding of the polymer and added material to form the composite particles may be purely the result of physically blending or tumbling the components together, or may be enhanced by the addition of a binding agent, i.e. a resin designed for bonding together dissimilar materials including but not limited to phenolic resins, and/or by the application of heat and/or by mechanical loading such as attrition milling or by any other means.

In such examples the relatively large particles will be of a size range typical of thermal sprayed powders, for example between 20 and 150 $\mu$m, the relatively fine particles will for example be in the size range of from 0.5 to 40 $\mu$m. The composite particles may also be of a construction whereby for example both the added powder and the polymer powder are in a very fine powder form having a particle size of from 0.5 to 20 $\mu$m. In such an example the aggregated particles comprise sub particles of each constituent and may be formed or agglomerated by conventional powder metallurgy techniques with or without a binder or by a spray drying method. Particles formed in these ways may be further processed to homogenize or densify them. This can be done for example by passing the agglomerated composite powder through a heat source such as a plasma flame.

In practice, the thermal spray powder may comprise a powder where the components are combined partially as a physical blend and partially as a composite. In some cases, one or more of the added materials may be partly composed of irregular particles and the balance composed of spherical particles.

The spraying of the powder mixture in accordance with the invention is effected by the conventional well known manner for thermal spraying, utilizing conventional thermal spray equipment. The thermal spray conditions however must be arranged and controlled to provide for substantial melting of the added powder while at the same time heat softening the polymer powder. Various factors, including, spray gun geometry and efficiency, flame temperature, gas/particle relative velocity, thermal properties, size and density of the particle and dwell time will determine the temperature the particles are heated to.

In the case of metal additions the greater thermal conductivity of the metal particles will cause them to be more rapidly heated than the polymer and consequently they may reach their melting point in the same environment and under the same conditions that the polymer particles are only surface heat softened. The term "surface heat softened" means a thermal conditioning of the polymer particles in which the surface of the polymer is heated to a temperature at which the same will deform and flow under pressure or impact as is required in thermal spraying. This takes place without heating the entire particle to a detrimental or degrading temperature. Such surface heat softening may include a superficial chemical or physical modification of the polymer powder surface.

The spraying may be effected for example by thermal spraying or by any technique whereby the powder is heated and propelled onto a surface to form a coating. In, for example, a plasma flame spraying process the powder may be injected axially or radially, internally or externally, upstream or downstream of the electric arc. One particular example of such equipment and associated spray parameters is the Metco Type 9M Plasma Spray System, utilizing a 9MB gun and a GP nozzle, No 2 powder port, argon plasma forming gas with equipment flow setting of 190, with hydrogen added at an equipment flow setting of 5, 75 arc volts and 500 amperes arc current. Powder is fed to the gun with a Metco Type 4 MP powder feeder using argon carrier gas with equipment flow setting of 50 and a powder feed rate of 23 to 26 g/min. Spray distance set at 75 mm to 100 mm. Further examples of suitable plasma guns are the Metco Type 3MB, Type 3MB2 and Type 7MB; the Sulzer Metco Type F4; the Metallisation PS50; the SNMI PS2, PS2 EV, and PS4 A; the METTECH Axial 3; and the Miller Thermal Model 3702 and Model SG-100.

Another thermal spray process for example is HVOF. One particular example of such equipment and associated spray parameters is the Metco Diamond Jet Series 1000, utilizing a V4 Air Cap; V3 Snooted Insert; V3 Injector; VA Shell; V4 Siphon Plug; Type B powder feed pick up shaft; Oxygen pressure 11.04 bar equipment flow setting of 40; Propane pressure 4.83 bar, equipment flow setting of 40; Nitrogen carrier gas at pressure 9.66 bar equipment flow setting of 70; air pressure 5.17 bar equipment flow setting of 60; spray rate 151 g/m in. Spray distance set at 250 mm. Further examples of suitable HVOF guns or systems are the Miller Thermal Model HV-2000; the OSU Super Jet System and Carbide Jet System; the Eutectic Taffa model JP-5000, the Eutectic TeroJet.

Examples of other thermal spray processes are HVAF and conventional combustion flame powder guns such as the Metallisation Mark 74, Metco Type 5P and Type 6P Guns; the Eutectic Castolin CastoDyn DS 8000 and CDS 8000 Guns; and Colmonoy Guns.

If the polymer, or polymer in combination with another material, or polymer in combination with metal were to be in the form of a strand, or for example a fabrication comprising powder compacted into a tube then examples of suitable thermal spray equipment would be the. Metco Type 14E; the Metallisation Mark 73, Mark 61 and Mark 66E pistols; the SNMI Master-Jet 2 range; the OSU Type D 8.

Spraying may be effected on any surface or substrate such as carbon steel, stainless steel, aluminum and alloys of aluminum, copper and alloys of copper, nickel and alloys of nickel, cobalt alloys, titanium and alloys of titanium. Although the substrate material normally comprises metals, other materials may be used including for example, plastics, oxide ceramics and fiber reinforced composite materials. The surface is normally cleaned and roughened to achieve bonding of the coating. In the case of metal substrates roughening of the surface may be achieved by grit blasting. This is an established process whereby hard sharp edged particles are impacted onto the surface normally propelled by high pressure air. The sharp edged particles may include chilled cast iron grit of size G24, and aluminum oxide of size range between 200 and 800 $\mu$m. The surface roughness achieved may be in the range from 2 to 6 $\mu$m.

Instead of, or preferably as well as surface roughening, a suitable self bonding material may be applied by thermal spraying. In the case of metal substrate materials self bonding coating materials are well known in the thermal spray art, they include molybdenum and various composites and alloys of nickel and aluminum, in wire, fabricated wire and powder form. These materials self bond to most metal substrates. Suitable materials for bonding to other substrates may also be used, such as copper or glass for ceramic substrates. Polymers including the oxidized polyarylene sulfide may be mixed with metals for bonding on to low melting point substrates, including plastics and fiber reinforced composite materials. In each example the bond coat would be applied in a thickness relevant to the material combination in question, for example nickel. Aluminum bond coats sprayed on to metal substrates would normally be about 125 $\mu$m thick. The polymer/metal mixture is sprayed to a thickness required by the particular application, normally in the range from 0.2 to 8 mm or even more. Depending upon the application requirements the coating will be either used in the as sprayed condition or there will be a machining operation to provide a suitable dimension and/or surface finish.

Coatings produced with a polymer/metal mixture are excellent for use as abradable seal clearance control coatings up to temperatures limited by the polymer, typically in the range up to 350° C. or 400° C. for example in the compressor section of gas turbine engines and internal combustion engine turbochargers and superchargers. Coatings produced with the polymer in combination with a high temperature alloy, sometimes also in combination with a solid lubricant, are excellent for use as abradable seal clearance control coatings at elevated temperature associated with the turbine section of a gas turbine engine. In this type of application, the polymer will disappear at elevated temperature and is used as a means of producing a thermal sprayed coating of controlled porosity. The same principle can be applied to any type of device or application requiring clearance control by means of an abradable coating. The coatings are also excellent for reaction vessels, heat resistant surfaces of kitchen ware, e.g. for pans, pots or ovens, and for any application where a high chemical and/or temperature resistance is required. Coatings can also be used for sealing, in particular on the seal areas of engine and pump shafts, and for bearings, in particular as low friction bearing surfaces. The properties of the coatings can under certain circumstances be further modified and adjusted by subsequent processing steps, for example a heat treatment to densify the coating.

Thermal sprayed layers comprising the polymer and/or the polymer in combination with other materials provide an excellent means for bonding dissimilar materials. Such a layer can be used to enhance the bonding of a wide range of non metallic coatings onto metal components, for example as an intermediate layer to enhance the bonding of polytetrafluoroethylene (PTFE) onto metal to form a durable non stick cooking surface. Conversely, such a layer can also be used to enhance the bonding of a wide range of metallic coatings onto non metallic materials.

The following examples are given by way of illustration and not limitation.

EXAMPLES

Preparation of polyphenylene sulfone ($PPSO_2$):

63 kg of polyphenylene sulfide powder (d50: 60 $\mu$m) with a Tg of 94° C. and a Tm of 290° C. were placed in 219 l of glacial acetic acid at 50° C., 1.2 l of concentrated sulfuric acid were added, and 91 kg of hydrogen peroxide (50%) were added dropwise over the course of 3 h, during which the temperature rose to 60–65° C. Following an afterstirring time of 2 h at 65° C. and 1 h at 80° C., the reaction dispersion was cooled and filtered off with suction at 50° C., and the solid product was washed with water and dried.

Yield: 70 kg; DSC data: Tg: 352° C.; Tm: 520° C. (decomposition) Elemental analysis: $(C_6H_4SO_2)n$; C: 55.6%, H: 3.2%, S: 24.6%, O: 16.0%. This corresponds to a degree of sulfur oxidation in the polymer of about 65%, based on 100% of the theoretically possible uptake of oxygen.

This polyphenylene sulfone is "the polymer" referred to in the subsequent examples.

Example 1

40% by weight of the polymer in powder form having a size range of from 18 to 135 $\mu$m and 60% by weight of a silicon aluminum alloy in powder form containing 12% silicon and having a particle size of from 10 to 62 $\mu$m were blended together in a tumbling action provided by a cone blender. The resulting mixture comprises composite particles where each discrete particle is made up of both constituents and individual particles comprising exclusively each constituent. The mixture was sprayed with a Metco Type 9M plasma spray system incorporating a 9MB gun and a 4MP powder feed unit. The 9MB gun was fitted with a GP nozzle, No 2 powder port, argon plasma forming gas with equipment flow setting of 185, with hydrogen added at an equipment flow setting of 5; the arc was set at a current of 500 amperes and approximately 75 arc volts. Powder was fed to the gun with a Metco Type 4 MP powder feeder using argon carrier gas at an equipment flow setting of 50 and a powder feed rate of 23 to 26 g/min. The substrate was a 300 mm length of 150 mm diameter tube of mild steel with a wall thickness of 2.4 mm. The substrate was grit blasted on the outside diameter with aluminum oxide grit under standard conditions. The substrate was mounted on a turntable and rotated, the plasma gun was mounted on a vertical traverse unit connected to the turntable unit such that the plasma gun traversed up and down with the spray stream impacting normal to the substrate. A bond coat of 95% nickel and 5% aluminum composite material was applied utilizing standard conditions and sprayed to a thickness of 125 μm. The powder mix was then sprayed to a thickness of 1.8 mm utilizing a spray distance of approximately 90 mm.

Example 1-A

Example 1 was repeated exactly except using a polymer powder with a size range of from 36 to 135 μm.

Example 2

Example 1 was repeated except for spraying the powder mixture the Metco Type 9M plasma spray system incorporating a 9MB gun was substituted by a Sulzer Metco Plasma Technique A2000 system with an F4 Torch fitted with a 6mm nozzle, 2.0 mm injector; the spray parameters are changed accordingly to the following, argon plasma gas at a flow of 70 liters per min, with hydrogen added at a flow of 8 liters per min; 500 amperes arc current; powder was fed to the torch at a rate of 50 g/min in a carrier gas flow of 8.5 liters per min. The spray distance was set at 120 mm.

Example 2-A

Example 2 was repeated exactly except using a polymer powder with a size range of from 36 to 135 μm.

Example 3

Example 1 was repeated exactly except the powder mixture was sprayed using a Metco Diamond Jet Series 1000 HVOF spray system instead of the Metco Type 9M plasma spray system. The Metco Diamond Jet Series 1000, utilizes a V4 Air Cap; V3 Snooted Insert; V3 Injector; VA Shell; V4 Siphon Plug; Type B powder feed pick up shaft; Oxygen pressure 11.04 bar equipment flow setting of 40; Propane pressure 4.83 bar, equipment flow setting of 40; Nitrogen carrier gas at pressure 9.66 bar equipment flow setting of 70; air pressure 5.17 bar equipment flow setting of 60; spray rate 150 gm per minute. The spray distance was set at 250 mm.

Example 3-A

Example 3 was repeated exactly except using a polymer powder with a size range of from 36 to 135 μm.

Example 4

Examples 1, 2 and 3 were repeated exactly except using different mixtures comprising a nominal 20%, 25%, 30%, 35%, 45% and 50% by weight of the polymer and in each case the balance of the mix comprising the 12% silicon aluminum alloy.

Example 4-A

Example 4 was repeated exactly except using a polymer powder with a size range of from 36 to 135 μm.

Example 5

Examples 1, 1-A, 2, 2-A, 3, 3-A, 4 and 4-A were repeated utilizing a 12% silicon aluminum powder which comprises partly powder of an irregular particle form and of a particle size from 10 to 62 μm (as described in Example 1) and the balance comprising a powder of spherical particle form also in the size range from 10 to 62 μm.

Example 6

Examples 1, 1-A, 2, 2-A, 3, 3-A, 4, 4-A and 5 were repeated but the component powders were mixed or tumbled together in a piece of equipment such as a cone blender having facility to heat the powder mixture to any predetermined temperature in the range up to 300° C.

Example 6-A

Example 6 was repeated with the addition of relatively heavy bodies, such as stainless steel balls of 1 cm diameter, to provide mechanical impact during the tumbling process.

Example 7

Previous examples were repeated but the silicon-aluminum was replaced by an MCrAlY comprising cobalt/nickel/chrome/aluminum/yttrium alloy or cobalt/chrome/aluminum,/yttrium alloy or nickel/chromelaluminum/yttrium alloy. The thermal and other characteristics of such alloys differ from those of silicon-aluminum, consequently the thermal spray parameters are adjusted accordingly. The polymer proportion in such a mixture is normally in the range from 5 to 40% by weight.

Example 7A

Example 7 was repeated with the addition of one or more materials in powder form which act as a solid lubricant, for example with graphite and boron nitride, respectively.

Example 8

A composite powder was produced comprising 40% by weight of the polymer having a size range of from 18 to 135 μm and 60% by weight of a silicon aluminum alloy containing 12% silicon flake powder having a particle size below 20 μm. The powders were mixed together with Ketjenflex MH a thermoplastic resin supplied by Akzo Nobel Chemicals Ltd. as a binding agent. The components were mixed together in a planetary mixing device with facility for application of heat to support curing of the resin. The resulting powder comprises polymer particles coated with silicon aluminum together with a small proportion of non combined component powders. The composite powder was thermal sprayed by the plasma process as described in Examples 1, 2 and 3.

Example 8-A

Example 8 was repeated exactly except using a polymer powder with a size range of from 36 to 135 μm.

Example 8-B

Examples 8 and 8-A were repeated except using different mixtures comprising a nominal 20%, 25%, 30%, 35%, 45% and 50% by weight of the polymer, in each case the balance of the mixture comprising the 12% silicon aluminum alloy flake powder.

Example 8-C

Examples 8 and 8-A were repeated but replacing the silicon aluminum flake powder with an MCrAlY as described in Example 7.

Example 8-D

Example 8-C was repeated except using different proportions of polymer powder in the range 5% to 40% by weight.

Optionally, such mixtures included a third component to act as a solid lubricant of the type described in Example 7-A.

Example 9

Examples 1 and 1-A were repeated but substituting stainless steel powder for the silicon aluminum powder. The stainless steel was a proprietary alloy with high corrosion resistance to combat the particular service conditions in which the resulting coating will operate. Mixes were produced utilizing a nominal 5%, 10%, 20%, and 30% by weight of the polymer. The powder mixture was thermal sprayed by the plasma process as described in Examples 1, and 2, or by HVOF as described in Example 3. Thermal spray parameters were tailored to suit the material properties and coating requirements.

Example 9-A

Powder mixtures were prepared and sprayed similar to those described in Example 9 except substituting the stainless steel with aluminum, aluminum bronze, other aluminum alloys, nickel, nickel alloys, copper, copper based alloys and babbit.

Through all the examples 1 to 9-A suitable thermal spray powders and thermal sprayed coatings showing good adhesion to the surface onto which they were sprayed were obtained.

What is claimed is:

1. A thermal spray powder comprising from 1 to 99% by weight of oxidized polyarylene sulfide and from 1 to 99% by weight of a second component selected from metals, carbides, ceramics and high temperatures polymers selected from the group consisting of polyimides, polyamide imides, polyester imides, aromatic plastics, and a mixture thereof.

2. The powder according to claim 1, comprising from 5 to 60% by weight of oxidized polyarylene sulfide and from 40 to 95% by weight of the second component.

3. The powder according to claim 1, wherein the oxidized sulfide is a polymer having recurring units of the formula (1)

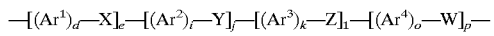

in which each $Ar^1$ $Ar^2$, $Ar^3$, $Ar^4$, W, X, Y and Z, independently of the others, is identical to or different from the others; the indices d, e, i, j, k, l, o and p are, independently of one another, zero or integers 1, 2, 3, or 4, at least one of the indices d, i, k, and o and at least one of the indices e, j, l and p being 1; $Ar^1$, $Ar^2$, $Ar^3$ and $Ar^4$ are simple or directly para-, meta- or ortho-linked arylene systems having from 6 to 18 carbon atoms; W, X, Y and Z are selected from —$SO_2$—, —S—, —SO—, —CO—, —COO—, alkylene or alkylidene groups, each having from 1 to 6 carbon atoms, and —$NR_1$— groups where $R_1$ is an alkyl or alkylidene group having from 1 to 6 carbon atoms, with the proviso that at least one of the groups W, X, Y and Z is —SO— or —$SO_2$—.

4. The powder according to claim 1 wherein the oxidized polyarylene sulfide and the second component form a composite powder in which discrete particles are made up of the constituent components.

5. The powder according to claim 4 wherein particles made up of oxidized polyarylene sulfide having a particle size of from 20 to 150 μm are coated with particles made up of the second component having a particle size of from 0.5 to 40 μm and/or particles made up of the second component having a size of from 20 to 150 μm are coated with particles made up of oxidized polyarylene sulfide having a size of from 0.5 to 40 μm, or wherein both the particles made up of oxidized polyarylene sulfide and particles made up of the second component have a size of from 0.5 to 40 μm.

6. The powder according to claim 1 wherein the oxidized polyarylene sulfide and the second component are partially in the form of a physical mixture and partially in the form of a composite powder according to claim 4 or 5.

7. The powder according to claim 4 in which the particles making up the powder are in the form of a rod, a strand or a fabricated structure where a powder is compacted into a tubular sheath.

8. The powder according to claim 1 having a particle size of from 10 to 200 μm.

9. The powder according to claim 1 wherein the second component is a metal selected from aluminum, aluminum alloy, copper, bronze, babbit, nickel, nickel alloy, stainless steel silicon alloys or a mixture thereof.

10. The powder according to claim 9 in which the metal is an alloy of silicon and aluminum, containing from 5 to 30% by weight of silicon.

11. The powder according to claim 10 comprising from 58 to 62% by weight of the powder of an aluminum alloy containing 12% by weight of silicon.

12. The powder according to claim 1 wherein the second component is an alloy selected from high temperature resistant alloys "MCrAlY".

13. The powder according to claim 12 wherein the second component is an alloy of cobalt/nickel/chrome/aluminum/yttrium, cobalt/chromelaluminum/yttrium, or nickel/chrome/aluminum/yttrium, or a mixture thereof.

14. The powder according to claim 12, further comprising a solid self lubricating additive selected from the group consisting of molybdenum disulphide, calcium fluoride, bentonite, mullite, graphite and boron nitride.

15. The powder according to claim 14, comprising from 3 to 8% by weight of boron nitride, from 15 to 30% by weight of oxidized polyarylene sulfide, and the balance to a total of 100% by weight of the thermal spray powder of a high temperature resistant MCrAlY alloy.

16. A process of forming a powder according to claim 1 into a coating by thermal spraying.

17. The process according to claim 16 in which the powder particles are heated in a plasma or combustion flame, or in a high velocity oxy fuel (HVOF) or high velocity oxy air (HVAF) combustion flame and deposited by projecting them onto a surface to form a coating.

18. The process according to claim 16 comprising the steps of thermal spraying and subsequent processing to modify the properties of the obtained coating.

19. A process of forming a powder according to claim 1 into a coating by thermal spraying wherein during thermal spraying the powder is heated to a temperature sufficient to substantially melt the metal component and heat soften the surface of the polymer component.

20. A coating produced by thermal spraying a powder according to claim 1.

* * * * *